June 29, 1948. H. C. RONFELDT 2,444,374
ENGINE ROCKER ARM
Filed Aug. 2, 1944

INVENTOR.
Henry. C. Ronfeldt.

Patented June 29, 1948

2,444,374

UNITED STATES PATENT OFFICE 2,444,374

ENGINE ROCKER ARM

Henry C. Ronfeldt, Toledo, Ohio, assignor to Toledo Stamping and Manufacturing Company, Toledo, Ohio, a corporation of Ohio Application August 2, 1944, Serial No. 547,734

2 Claims. (Cl. 74—519)

This invention relates to engine rocker arms and more particularly to stamped metal engine rocker arms provided with valve tappet contacting bearing inserts.

Heretofore, great difficulty has been encountered in locating the valve tappet contacting bearing insert. The stem of the contacting bearing insert is secured in a socket or substantially cylindrical opening. In assembling the rocker arm member the contacting bearing insert is inserted in a socket. It is very important that the contacting bearing is properly located in the socket. The contacting surface of the contacting bearing insert is curved about an axis and it is essential that this axis makes the proper angle with the plane of the rocker arm when assembled. It has been practically impossible to do this in the past because the round stem could be placed in the socket at any angular position. If the contacting bearing insert is turned slightly it will not properly contact the valve stem. The curved bearing surface is to provide a line contact with the valve stem as the rocker arm oscillates. If the contacting bearing insert is not properly aligned the curved surface will be at an angle with the center line of the rocker arm shaft and improper or point contact with the valve stem will result. This in turn results in excessive wear and also causes noisy tappets.

Trying to assemble the contacting bearing insert properly by sight is inaccurate and requires considerable time. Using fixtures to locate them from the curved surface has been another method of assembly that has proven slow and inaccurate.

One of the objects of my invention is to provide a contacting bearing insert with a means adapted to properly locate the contacting bearing insert in the rocker arm.

Another object of my invention is to provide a contacting bearing insert that requires less time to assemble properly in a rocker arm.

Another object of my invention is to provide a contacting bearing insert that is adapted to quantity production.

Another object of my invention is to provide a contacting bearing insert that is simple, durable, and inexpensive.

These and other objects of my invention will be more clearly pointed out in the following description, claimed in the claims and illustrated in the accompanying drawings.

Figure 1:
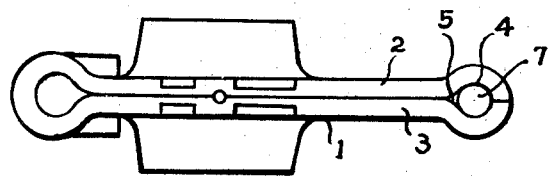
Fig. 1 is a top plan view showing my novel contacting bearing insert secured in a stamped rocker arm.
Figure 2:
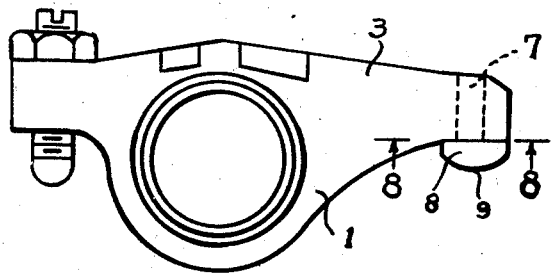
Fig. 2 is a front elevation of the rocker arm shown in Fig. 1 with an adjustable contacting bearing.
Figure 7:
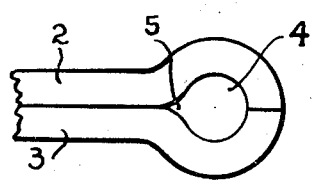
Fig. 7 is an enlarged fragmentary top plan view of a stamped rocker arm showing a socket adapted to receive my novel contacting bearing insert.
Figure 4:
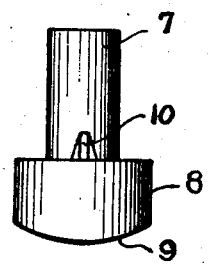
Fig. 4 is a front elevation of the contacting insert shown in Fig. 3.
Figure 5:
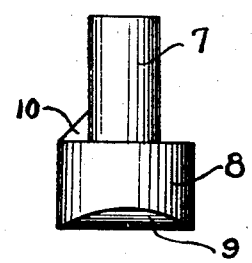
Fig. 5 is a side elevation of the contacting bearing shown in Fig. 3.
Figure 8:
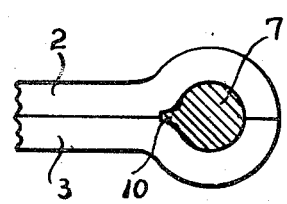
Fig. 8 is an enlarged sectional view taken along line 8—8 of Fig. 2.

Referring to the drawings I have shown in Figs. 1 and 2 a stamped rocker arm 1 comprising two layers 2 and 3. A substantially round socket 4 is formed by oppositely formed grooves in the layers 2 and 3. The socket 4 is provided with a somewhat wedge shaped opening 5 where the layers 2 and 3 separate to form the socket 4.

Figure 3:
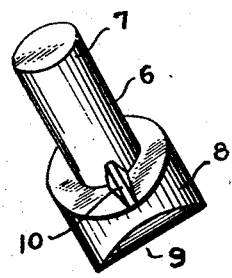
Fig. 3 is an enlarged pictorial view of my novel valve tappet contacting bearing insert.

The contacting bearing insert 6 shown in Fig. 3 comprises a cylindrical stem member 7, an upset head 8 at one end thereof. The head 8 is provided with a curved and hardened contacting bearing surface 9. This surface 9 is adapted to contact the valve stem in an internal combustion engine and apply the pressure to the valve stem required to open it. This surface must be smooth and hard to resist the strenuous pressure, and rubbing action to which it is subjected.

When the contacting bearing surface 9 is properly aligned the surface 9 will make a line contact with the valve stem. If the bearing surface 9 is not properly aligned point contact results which in turn results in excessive wear. A locating web or tab 10 is located adjacent the stem 7 and the upset head 8. The locating web is somewhat wedge shaped and fits into the wedge shaped opening 5 of the socket. In some cases it is desirable to press the locating web or tab into the wedge shaped slot 5. It will readily be seen that the locating web locates the contacting bearing in a definite position with respect to the rocker arm member 1. In production the locating web or tab 10 is formed at a point that will locate the curved bearing surface 9 in a predetermined position with respect to the rocker arm member 1.

When the contacting bearing 6 is being assembled with the rocker arm member 1 the stem 7 is inserted in the socket 4 so that the locating web 10 approximately aligns with the wedge shaped slot 5. The wedge shape or contour of the locating web or tab 10 guides the contacting bearing member 6 into proper alignment with the rocker arm member 1.

After the contacting bearing insert 6 is properly located it may be spot welded, brazed or otherwise permanently secured in position.

Figures 6, 9:
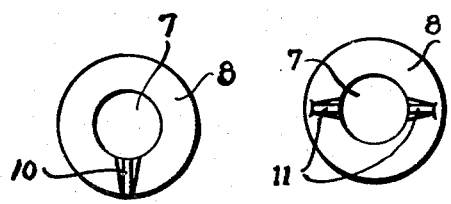
Fig. 6 is a top plan view of the contacting bearing insert shown in Figure 3.
Fig. 9 is a top plan view of another form of my invention.
Figure 10:
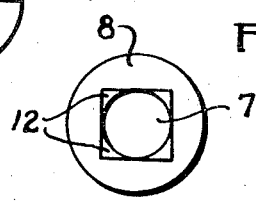
Fig. 10 is a top plan view of another form of my invention.

Fig. 9 shows a variation in my invention in which two locating webs or tabs 11 are employed. Fig. 10 discloses another variation in which four locating webs or tabs 12 are used.

While I have described several embodiments of my invention, I do not wish to be limited to the particular forms shown and described as it will be apparent that many modifications therein may be made without departing from the scope of my invention as set forth in the appended claims.

I claim:

1. A laminated engine rocker arm provided with an eyelet between the layers of said laminated rocker arm, and a curved substantially V-shaped opening between said layers adjacent said eyelet; and a contacting bearing insert comprising a stem portion adapted to be secured in said eyelet, an enlarged head portion integral with said stem portion, said enlarged head provided with a curved contacting bearing surface and a wedge shaped guide web extending from said stem portion, said web adapted to engage with said curved V-shaped opening, whereby said contacting bearing insert surface is guided during assembly of said stem portion in said eyelet into a predetermined position with respect to said laminated layers.

2. An engine rocker arm comprising: an arm member and a contacting bearing insert secured at one end of said arm member; said arm member comprising a plurality of superimposed layers, an eyelet between said layers at one end of said arm member and a substantially V-shaped opening between said layers adjacent said eyelet; said contacting bearing insert comprising a stem portion secured in said eyelet, an enlarged head portion integral with said stem portion and a wedge shaped guide web integral with said stem portion adapted to engage said V-shaped opening whereby said contacting bearing insert is automatically guided into a predetermined position with respect to said arm member.

HENRY C. RONFELDT.

REFERENCES CITED

The following references are of record in the file of this patent:

UNITED STATES PATENTS

| Number | Name | Date |
|---|---|---|
| 626,822 | Baseman | June 13, 1899 |
| 1,102,188 | Dyer | June 30, 1914 |
| 1,797,296 | Ray | Mar. 24, 1931 |
| 1,830,976 | Ashworth | Nov. 10, 1931 |
| 2,176,083 | Leake | Oct. 17, 1939 |

FOREIGN PATENTS

| Number | Country | Date |
|---|---|---|
| 508 | Great Britain | Jan. 9, 1911 |